Oct. 2, 1928.

C. L. ZABRISKIE

GREASE PUMP

Filed Dec. 11, 1925

Oct. 2, 1928.  1,686,308
C. L. ZABRISKIE
GREASE PUMP
Filed Dec. 11, 1925    4 Sheets-Sheet 2

INVENTOR
Charles L. Zabriskie
ATTORNEY

Oct. 2, 1928.

C. L. ZABRISKIE 1,686,308

GREASE PUMP

Filed Dec. 11, 1925     4 Sheets-Sheet 3

INVENTOR
Charles L. Zabriskie
By George C. Lean
his ATTORNEY

Oct. 2, 1928.

C. L. ZABRISKIE

1,686,308

GREASE PUMP

Filed Dec. 11, 1925

INVENTOR
Charles L. Zabriskie
BY
his ATTORNEY

Patented Oct. 2, 1928.

1,686,308

UNITED STATES PATENT OFFICE.

CHARLES L. ZABRISKIE, OF NEW YORK, N. Y., ASSIGNOR, BY MESNE ASSIGNMENTS, TO ROGERS PRODUCTS CO., INC., A CORPORATION OF NEW JERSEY.

GREASE PUMP.

Application filed December 11, 1925. Serial No. 74,680.

My present invention is shown as embodied in an apparatus designed to supply oil or grease to bearings either through the usual valved fittings in accordance with the system described in British patent to Alley, et. al., No. 21,893 of 1906, or by screwing the coupling into the threaded end of the duct after the grease cup or other fitting has been removed. Such ducts or the fittings that lead to them, particularly on automobiles, trucks, etc., frequently become clogged with dirt, hardened lubricant, etc., to such an extent that it is impossible to force grease, or even oil through them by any of the force-feed lubricators or grease guns now available for the purpose. On the other hand, there are special cold weather conditions of ordinary grease where the lubricant is too viscous and special kinds of grease that are too sticky for use in any of the now known force-feed devices.

I have discovered, however, that in actual practice, clogged grease ducts can be blow clear in almost all cases by forcing in the grease under pressures in the neighborhood of 10,000 to 14,000 pounds per square inch, and by my present invention such pressures are easily attainable. While much higher pressures are easily attainable by my apparatus, actual experience seems to show, that all clogged ducts blow through within the above range unless positively closed as by a fragment of stone or metal large enough and hard enough to require drilling.

For general use, any pump is equipped with a flexible metal conduit terminating in a standard oil duct screw-thread now used for interchangeably securing the ordinary grease cups or the old fashioned valve-closed nipples which have recently achieved renewed popularity. While such standard screw-thread is desirable for universal use, it is obvious that for special uses the coupling thread may be made to fit any particular grease cup fitting or any special nipple that may be desired.

Another feature is that for general utility the pump must be capable of handling ordinary lubricating greases in cold weather when they are exceedingly stiff, even semi-solid. Also, there have recently been discovered extraordinarily efficient greases that are not only very viscous but are also sticky. The pump which I have devised is designed with automatic check valves, and also with hand-operable vent or relief valves such that ordinary cold grease or special sticky grease can be handled perfectly.

A structural advantage of my device is that it comprises a very small capacity, very high power plunger pump, integral with a base carrying a reservoir or barrel supplying grease to the pump, and said base is fitted with a detachable extension or platform extending in the direction of the pump handle so that any desired power may be exerted on the handle either to raise or lower the same without any tendency to tilt either the pump or the reservoir.

Another feature is having the bottom of the pump cylinder above the level of the bottom of the supply cylinder so that grease from the latter can flow directly beneath the valve intake of the pump.

Another feature of my invention is employing as the outlet check valve of the pump, a long finely tapered cone engaging a very small area seat and backed by a very powerful spring. With this arrangement, the valve offers minimum resistance to the grease forced out by the pump plunger on the forcing stroke, and, on the suction stroke it readily and surely seats itself regardless of the stiffness or stickiness of the grease, first, because its wedging displacement of the grease is at a very acute angle, second, because the relatively great length and large base of the cone valve affords effective frictional engagement with the grease, so that slight reverse flow of the latter on the suction stroke of the pump is practically 100% efficient in producing equal reverse seating movement of the valve, and third, because the valve is backed by a powerful spring which has means whereby its initial pressure may be adjusted to make the predetermined opening pressure, that must be applied by the pump, as high as may be desired.

The above and other features of my invention may be more fully understood from the following description in connection with the accompanying drawings, in which.

In the form shown in Figs. 1 to 6, a grease reservoir is shown as comprising a cylinder, 1, screw-threaded into an annulus or collar, 2, integral with a suitable base, 3. The cylinder may conveniently be a drawn steel tube, say, 4¼ inches internal diameter with ⅛ inch walls and, say, 15 inches long. The cylinder, 1, is closed at the top by a cap, 4, having a radially extending flange, 4ª, abutting the top of the cylinder and a depending screw-threaded flange, 4ᵇ, which, when screwed down tight, is permanently and irremovably secured as by a blind rivet, 4ᶜ. Mounted in the cap is a vertical rod, 5, having at the upper end an operating handle, 6, and at its lower end a piston head, 7, provided with a suitable packing, preferably in the form of a downwardly directed cup leather, 8. The piston and cup leather are secured to the rod, 5, in any suitable way, as by forming the latter with a shoulder, 9, reduced shank, 10, and a riveted head, 11, on the lower end of the latter, riveted down on the clamping plate, 8ª, which is preferably of a diameter nearly as great as the cup leather.

The piston is normally spring pressed downward, by a powerful spring, 7ᵇ, preferably cone-shaped and having its smaller end centered about a depending boss, 4ᵈ, on the lower face of the closure, 4, and its lower end centered by an upstanding marginal flange, 7ª, on the piston member 7.

The piston may be retracted, compressing the spring, by means of the handle, 6, and may be locked in such position by rotating the handle to bring the projecting ends of pins, 5ª, 5ª, first into registry with slots, 5ᵇ, in the cover, while retracting and then to bring the pins out of registry with said slot.

A locking groove, 5ᶜ, may be provided to prevent accidental rotation of the pins to the releasing position. With the pins thus seated, the head, 4, is locked to the rod, 5, and, the head being permanently locked to cylinder, 1, as described, the latter may be unscrewed from the base flange at 2, using the handle 6 as a wrench. The piston, 7, remaining locked in the retracted position, the cylinder may be packed with grease, through its open end and the cylinder re-screwed to the base.

The base, 3, carries, preferably integral therewith, the pump cylinder, 13, in which slides plunger, 14, preferably provided with cup leather, 15, secured by screw, 16. This plunger, 14, is operated by lever 18, which may have a removable extension handle, 19. The extension handle is preferably provided with a bayonet joint, as shown at 18ª, and accidental disengagement is opposed by means of spring, 19ª, which operates to hold the parts in the locked position shown in Fig. 1.

The lever is secured to the plunger 14 by pivot 20 and is fulcrumed on pivot 21 at the upper end of link 22 which is pivoted to the base at 23. Preferably, the base, 3, carrying the above parts has a square flange portion, 3ª, affording a base amply sufficient for stable support of the above parts until great stress is applied to the long handle 19 in operating the plunger 14. To take care of the latter condition, the square base 3ª is removably fitted into an operating base of oblong form, comprising a small, downwardly-presented, angle iron, 3ᵇ, rigidly secured as by spot welding between two longitudinal, upwardly-presented angle irons, 3ᶜ and 3ᵈ, which are held parallel with each other on opposite sides of the plane of the pump handle, by a transverse bar or plate, 3ᵍ. The edge of the base 3ª is held in engagement with the bottom flanges of the angle irons, 3ᶜ, 3ᵈ, by slipping one edge of the base under the flange of 3ᵇ and inserting a removable locking rod, 3ᵉ, over the opposite edge of said base and securing the same by cotter pins, 3ᶠ.

The ducts and valves for control of passage of the grease from reservoir 1 through the pump cylinder and to the flexible metallic hose 25 terminating in the nozzle 26 for detachable application to the bearing or other duct to be cleaned or lubricated, are preferably formed in the base 3. As will be evident fom Figs. 3 and 4, the grease is forced from the reservoir 1 through a wide outlet 28, drilled from the outside, beneath the pump cylinder 13, intersecting up passage 31 the outlet of which is controlled by ball check valve 32. Displacement of the ball from the valve chamber is prevented by a projection 33 on the end of outlet check valve 36. A screw plug, 35, permanently closes the outer opening through which the pump intake passage 28 was drilled.

Figures 4, 5:
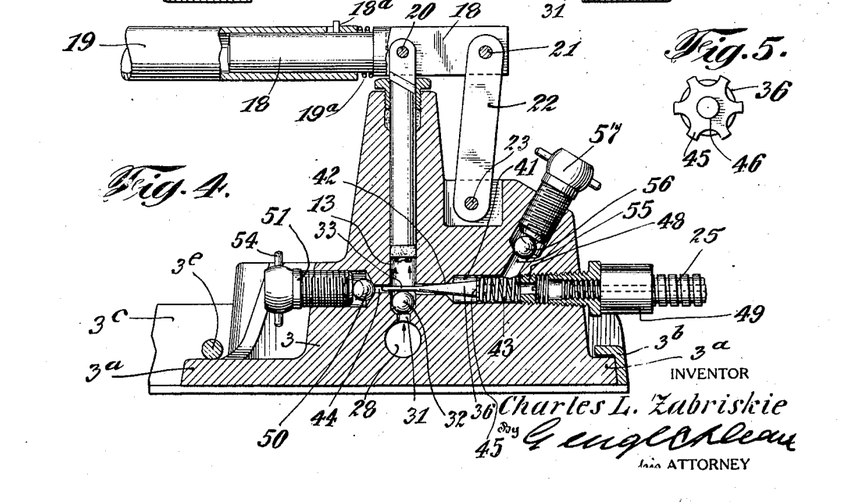
Fig. 4 is a vertical sectional detail through the pump, valve, and ducts on the line 4—4, Fig. 1.
Fig. 5 is an enlarged detail showing the rear end of the valve.

The intake 31 is in the bottom of the pump cylinder, coaxial therewith, and very short so that a large cross-section of the grease is delivered through the passage 28 in operative relation to the intake valve 32, with very little frictional resistance. As shown in Fig. 4, the pump cylinder, its intake 31, its outlet 41 and the supplemental priming and relief valves described hereinafter, are all drilled in the same vertical plane of the base, preferably parallel with the supplemental base frame.

As shown in this figure, the outlet check valve 36 is a very sharp cone or needle having a very narrow seat at 42, scarcely more than line contact, and this, together with the sharpness of the wedging angle, makes it very easy for the valve to move rearwardly to closed position whenever the back pressure of the grease in pipe 25 plus the force of the spring 43 exceeds the pressure in the pump cylinder. The valve is kept in alignment with the outlet by having the above referred to extension 33 engaging the duct 44 and at the other end it is provided with a spider, 45 (see Fig. 5) slidably engaging the walls of outlet 41. This spider may be a piece of sheet metal having a drive fit on a projection 46 at the rear or base end of the needle valve. The spider has a further function as affording substantial piston area for engagement with grease so that forward movement thereof tends to open the valve and rearward movement tends to close the valve. It has a further function as a seat for one end of the closing spring 43. This spring is preferably powerful, for stiff grease, preferably exerting a pressure of, say, 50 pounds. This pressure is easily adjustable and the valve is also made self accommodating for wear by having the right hand end of the spring abut against a bushing, 48, which may be screwed in or out, independently of the outlet nipple 49.

Figure 1:
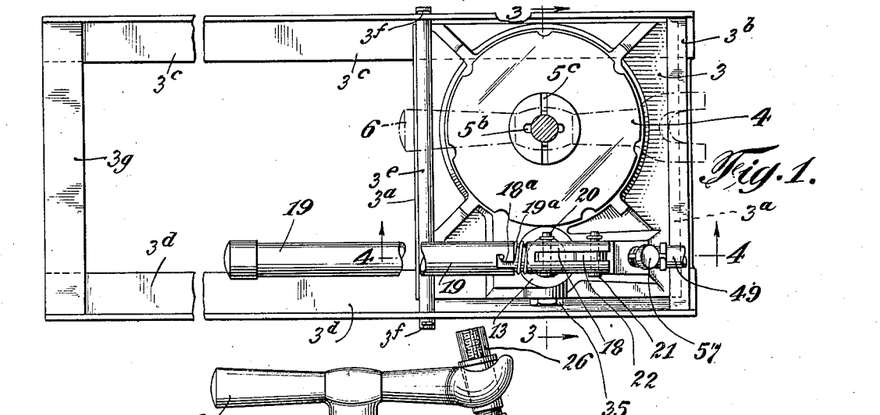
Fig. 1 is a top plan view and Fig. 2 is a side elevation of one embodiment of my invention.
Figure 2:
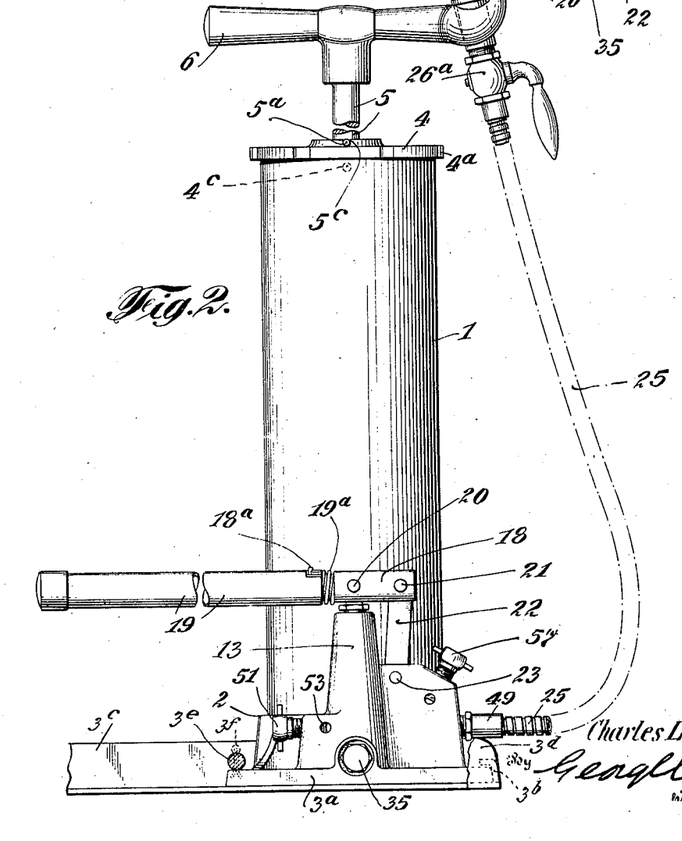

Important features of my invention are the priming vent valve controlling outlet from the base of the pump cylinder, above the inlet check 32, and the pressure relief valve for relieving pressure in the hose. As shown in Fig. 4, the priming outlet is through passage 44, closed by ball 50 which may be released by unscrewing plug 51. It is not necessary to completely unscrew the plug, because, as shown in Fig. 2, there is an outlet, 53, from the ball chamber throuh which vent may be had as soon as the ball is unseated from the closing position shown in Fig. 4. The screw plug, 51, is made with a cross-pin 54 on which the pump handle 19 may be used as a wrench for screwing and unscrewing the valve plug. I find that such a relief valve for the bottom of the pump cylinder has a distinct advantage in connection with the force feed applied to the grease by the spring 7$^b$, particularly where the grease is loaded into the reservoir cylinder from the open end thereof. In actual operation, I find that there is a selective segregation and outflow of the air preferentially to outflow of the grease. After the reservoir has been filled, I find that by opening the valve, 50, 51, the air will to a large extent discharge itself and a few strokes of the pump will completely prime the pump so that the piston 14 can suck on inexpansible grease instead of on elastic air. Sometimes a repetition of this operation of opening the priming valve and reciprocating the pump plunger may be necessary before all of the air is expelled from the cylinder, but it is a remarkable fact that any air seems to entirely disentangle itself from grease in the reservoir as the result of not more than two such operations. Thereafter, the pump has only solid grease to operate upon.

A precisely similar valve is shown as communicating with the outlet passage 41 through a vent passage 55, normally closed by ball 56 which is pressed to position by screw plug 57. This relief valve may be used at any time to relieve pressure in the hose 25 or the duct to which it is connected. It is seldom used, but is absolutely necessary on those rare occasions where an oil duct being charged with grease is found to be hopelessly blocked. In such cases, the pump pressure is run up to, say, 14,000 pounds or more per square inch before discovery of the fact that the obstruction is not removable by pressure. This enormous pressure positively locks all the couplings, so that they cannot be unscrewed even by a pipe wrench, and the only other way the apparatus can be detached from such a duct under such conditions would be to saw or drill the metal fittings.

Figure 6:
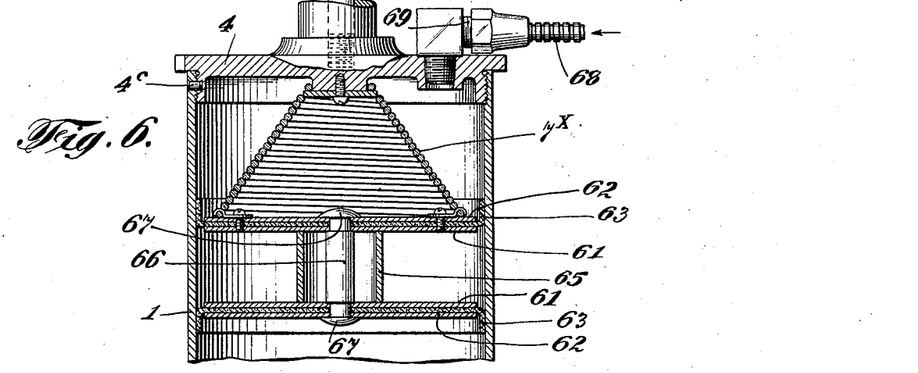
Fig. 6 is a vertical sectional detail showing a combined spring and air pressure arrangement whereby air pressure may be applied to force feed the grease in the reservoir and a spring may operate to retract the piston when the air pressure is removed.
Figure 7:
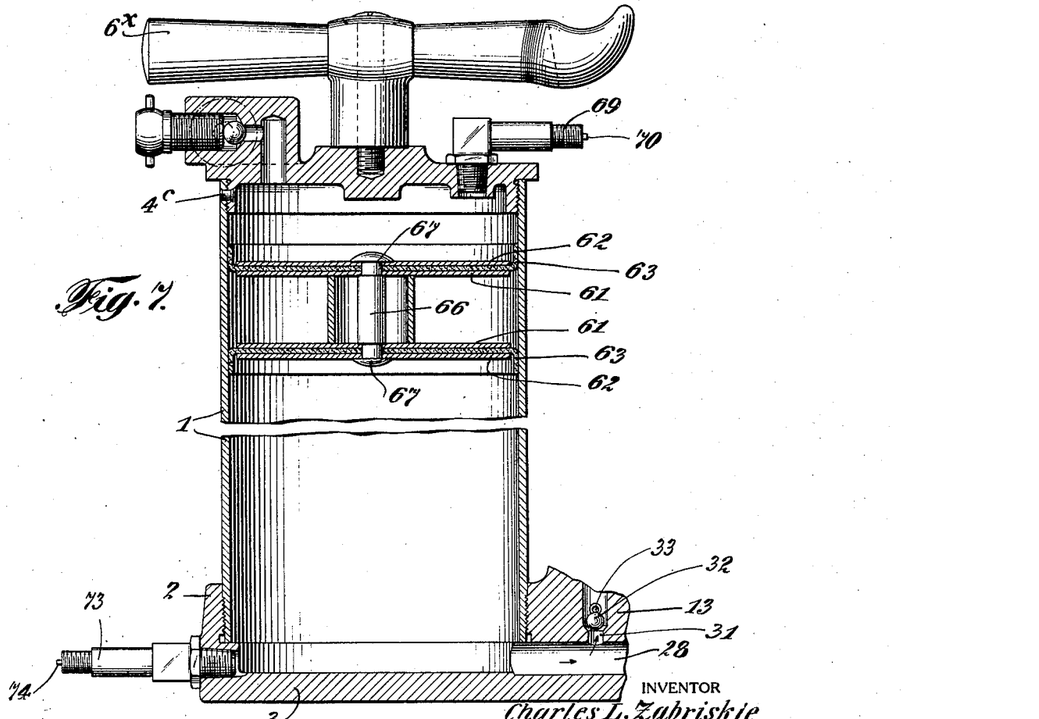
Fig. 7 shows a similar vertical section of a modification, wherein air pressure is employed both for force feeding and for retracting.

In Figs. 6 and 7 I have shown a floating piston as a means for applying pressure to the grease supply in cylinder 1. In both cases, the piston is double-headed, each head comprises a pair of clamping plates, 61, 62, and an intermediate cup washer 63, the upper one being cupped upwardly and the lower one cupped downwardly. The two heads are spaced apart by collar 65 and are held together by tension member 66 shouldered at each end, having a reduced portion extending through the respective piston heads and both end portions riveted down on the respective clamping plates 62, as shown at 67, 67.

In Fig. 6, the double-headed piston is forced down by compressed air supplied from any suitable source as, for instance, the pipe 68 of an ordinary tire inflating outfit such as are in common use at garages. The reservoir inlet may have any suitable form of check valve, as, for instance, a tire inner tube valve in the pipe 69. Such a valve is conventionally indicated by the usual projecting shank, 70, whereby such valves are opened to relieve excessive pressure (see Fig. 7).

Figure 3:
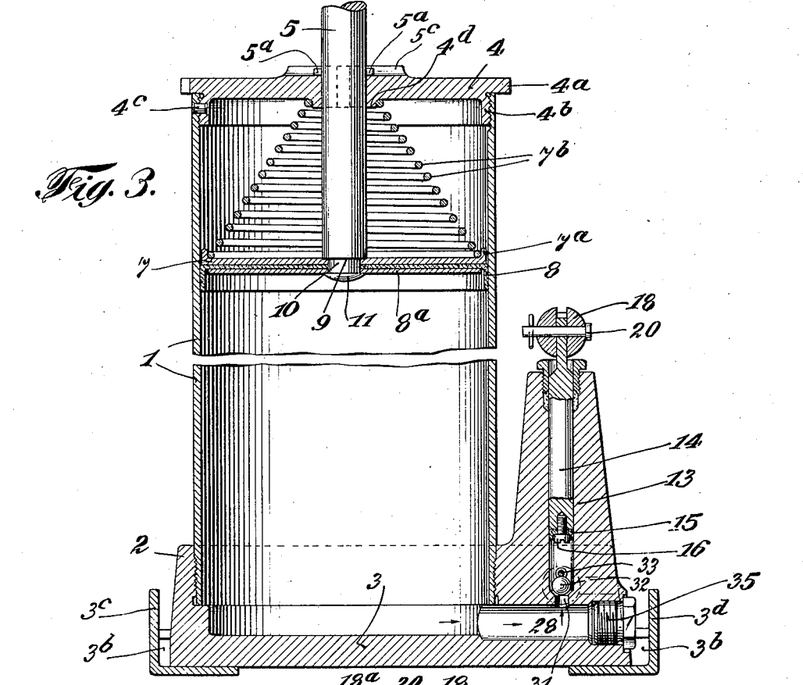
Fig. 3 is a vertical central section on the line 3—3, Fig. 1.

In Fig. 6 the piston is retracted by conical spring 7ˣ somewhat like that shown in Fig. 3, except that in the present case the spring is normally under tractile instead of expansive tension.

In Fig. 7, the double piston is the same and the air pressure is applied through valves 69, 70, as before, but in lieu of retracting spring there is a second tire valve fitting, 73, 74, whereby pressure may be applied below the piston to force it to the retracted position. The latter has the advantage that the piston may be forced further back than where a spring is used. In Fig. 7 I have shown a hand operated relief valve similar to those used for the pump, which may be used to relieve the feed pressure, in lieu of pushing in on the tire valve 70, which latter is necessarily of small outlet capacity. Such a relief valve may of course be used on form shown in Fig. 6.

The pump relief valves described above are peculiarly adapted for their purpose, the screw plugs, 51, 57, being of very large diameter so as to have great area of threaded engagement with the side walls and therefore capable of withstanding very great stress whether applied endwise from the interior or applied by screwing effort from the exterior. At the same time, they do not have to have the accuracy of ordinary valve fittings, because the valve closing elements are the steel balls, 50, 56, which are self centering independently of the screw plugs, engaging the plugs only through the flat end surfaces of the latter, the pitch of the cone seats for the balls being such that they cannot possibly become cocked, particularly as they are always copiously lubricated by the grease to which they are exposed.

Figure 8:
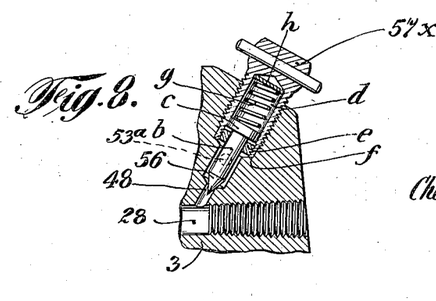
Fig. 8 is a detail section showing an automatic type of safety relief valve.

While the priming valve, 57, may be hand-operated as described, it is desirable to have it also automatically operating as shown in Fig. 8, particularly where a flexible hose connection is employed in connection with very high pressures. For instance, if the pump shown in the drawing has a plunger 3/8 inch in diameter and the handle has an operating ratio of, say, 1½ inches between pivots 20 and 21 as against, say, 20 inches for the effective length of the detachable handle, the weight of an ordinary man applied to the handle may produce a pressure of approximately 2500 pounds on the grease in the pump cylinder, 13. The area of the pump cylinder being but little over 1/10th of a square inch, the pressure per square inch will be over 20,000 pounds. On the other hand, an operating pressure of, say, 14,000 pounds per square inch seems to be amply sufficient for all practical purposes, whereas most of the metallic hose conduit I have used is likely to rupture at or near said pressure of 20,000 pounds per square inch. Hence an important practical feature of my invention is this very simple form of automatic relief valve shown in Fig. 8, which I find is not only simple but very rugged and can be relied upon to open within 100 pounds of the pressure for which it is designed. For instance, I preferably design it for 14,000 pounds maximum pressure and find that in practice, it can be relied upon to operate between 13,900 pounds and 14,100 pounds and in most cases the operation will be even closer than these figures would indicate.

As shown in Fig. 8, the relief valve plug, 57ˣ, is made automatic by causing it to apply pressure on the valve element, 56, through a stem, $b$, integral with a piston head, $c$, fitting a cylinder, $d$, drilled axially of the plug and closed at the lower end by a screw threaded annulus, $e$, which is preferably retained permanently in place by slightly riveting or spinning over it the edge of the metal of the screw plug, as at $f$. In this form, the relief outlet, 53ᵃ, is preferably a duct or bypass, discharging into the supply reservoir, as, for instance, through passage 28. The pressure on the valve, 56, depends on the strength of spring, $g$, and while springs can be made sufficiently near uniform desired strength to suit most practical purposes, very close regulation to compensate for the slight differences in springs may be had by employing one or more discs, $h$, as spacers to vary the initial compression of the spring. Such disc may be as thin as 1/64th of an inch, as many of them being used as may be desired.

As an illustration, if the diameters of valve, 56, duct, 48, and the shape of the valve seat give, say, 1/16th inch diameter for the pressure of the grease upon the ball, a nominal 70-lb. spring may be used at $g$, giving an approximation of 14,000 lbs. as the relief pressure. Close regulation for springs of different strength may be had by testing and adjusting as above before the annulus, $e$, is permanently locked in place.

In Figs. 9 to 12, I have shown simple forms of coupling that will not leak under the above described high pressures.

Figure 9:
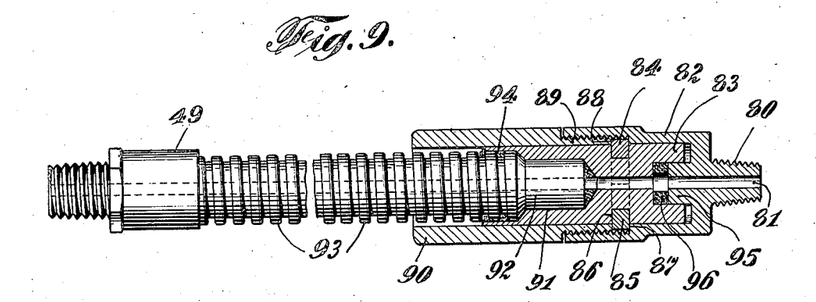
Fig. 9 and Fig. 10 are longitudinal sectional views of desirable forms of coupling, the former showing an external screw thread and the latter an internal screw thread.

In Fig. 9 the coupling screw or nipple, 80, is of standard size, taper and pitch adapted to screw into the outer ends of oil ducts of automobiles and trucks after the usual grease cup, valved inlet or other fitting has been removed, and it has an internal passage, 81, through which the grease is forced. It is carried by sleeve, 82, which is swiveled on a head, 83, through the medium of a split ring comprising two halves, 84, 85, applied in an annular recess, 86, and of size somewhat larger than the head so as to form a projecting flange having its forward face engaged by shoulder, 87, of sleeve 82 and its rear faces by the forward end, 88, of a screw-threaded sleeve, 89, which extends rearwardly and forms a convenient hand-grasp, 90, whereby the nipple, 82, may be rotated to screw the thread thereof into or out of the oil duct opening. The head, 83, is secured to the metallic hose in any desired way, as for instance, in a rearward extension having a smaller diameter portion, 91, in which is brazed the wire wound sheathing, 92, of the conduit, while the external flexible armor, 93, is brazed into a larger diameter portion, 94.

As shown in Fig. 9, the nipple, 80 has a rearward extension, 95, extending into contact with suitable packing, preferably an ordinary flat washer or gasket, 96. So far as concerns the construction and operation of this packing, 96, it is quite similar to the washers commonly employed for the swivel coupling between the lengths of ordinary garden hose, except that being exposed to grease, the material is preferably leather instead of rubber.

The parts, 80, 95, preferably have the same dimensions as the valved fittings or nipples frequently used in place of grease cups so that in case it is desired to couple directly to such nipple without removing it, the only change necessary is to substitute for sleeve, 82, another sleeve having an internal screw thread adapted to fit whatever lugs or screw members happen to be used on any particular nipple.

Figure 10:
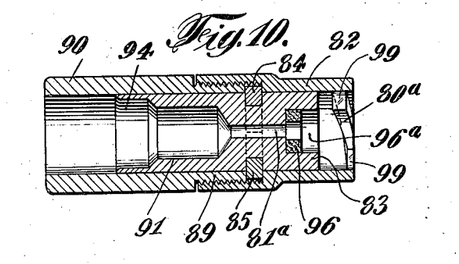
Figure 11:
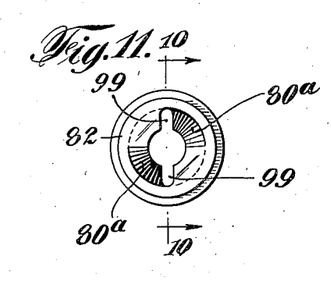
Fig. 11 is a face view of the coupling.

For instance, in Fig. 10, all parts of the head, packing and coupling are the same as shown in Fig. 9, except that the sleeve 82 is formed with two half turns of internal screw thread, 80$^a$, 80$^a$, adapted to fit corresponding external thread elements on the nipples and the latter may be merely two lugs projecting radially on opposite sides of the nipple. As shown in Fig. 11, the two-thread segments or equivalent lugs of the nipple screw into the cavity in sleeve 82 through the two openings, 99, the threads or lugs simultaneously engaging two half turn thread segments, 80$^a$, so that the screwing stress is wholly parallel with the axis of the coupling and there is no cocking tendency such as would result if only one lug and one screw thread were employed.

Figure 12:
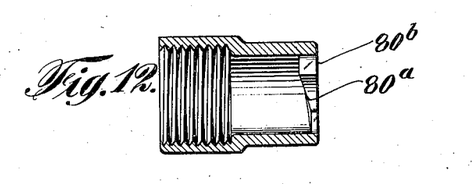
Fig. 12 shows a modification of the internal screw thread.

Obviously, the thread, 80$^a$, will be made to fit any thread that may be employed on the nipple and in certain cases where only radial lugs are used on the nipple, the thread, 80$^a$, may be thickened towards its inner end to afford greater strength, as at 80$^b$, Fig. 12.

By reference to Fig. 10, it will be seen that the central hole through the flat leather washer 96 is of substantially larger size than the inlet conduit, 81$^a$, through which the grease is supplied, say, $\frac{1}{16}$ inch larger, so that the column of grease issuing from such conduit, being of less diameter, cannot get behind the washer and will not carry the washer forward along with it.

The handles 6 (Fig. 2) and 6$^x$ (Fig. 7) may have one end formed somewhat like a telephone receiver hook for holding the coupling end of the hose and, if desired, a hand-operated valve or cock, 26$^a$, may be employed for controlling flow of grease to or from the coupling.

I claim:
1. A grease pump, including a small area plunger, power multiplying means for reciprocating it and a cylinder provided with an inlet with check valve, means for supplying grease under pressure to said inlet, an outlet with check valve and an outlet conduit with an outer coupling for grease-tight connection with a lubricating duct, in combination with an emergency relief valve adapted to vent pressure at a point between the outlet check valve and said coupling; a priming vent valve adapted to vent the pump cylinder at a point between the inlet check valve and the pump plunger.

2. A grease pump, including a small area plunger, power multiplying means for reciprocating it and a cylinder provided with an inlet with check valve, means for supplying grease under pressure to said inlet, an outlet with check valve and an outlet conduit with an outer coupling for grease-tight connection with a lubricating duct, in combination with a priming vent valve adapted to vent the pump cylinder at a point between the inlet check valve and the pump plunger.

3. A grease pump, including a plunger, means for reciprocating it and a cylinder having an inlet with check valve, means for supplying grease under pressure to said inlet, an outlet with check valve and powerful closing spring therefor, in combination with externally operable means for venting the pump cylinder at a point between the inlet check valve and the pump plunger.

4. A grease pump, including a small area plunger, power multiplying means for reciprocating it and an upright pump cylinder provided with an upward inlet with downwardly seating check valve, an outlet with check valve and an outlet conduit with an outer coupling for grease-tight connection with a lubricating duct, in combination with a relatively large volume reservoir comprising an upright cylinder and means including a piston for force feeding grease downward in said cylinder and a large area outlet from the extreme bottom of said reservoir extending horizontally below the intake of the pump, and a priming vent valve adapted to vent the pump cylinder at a point between the inlet check valve and the pump plunger.

5. A grease pump, including a pump cylinder, a plunger in said cylinder and means for reciprocating it, in combination with an inlet check valve for the intake of the pump, a conduit affording outlet from the cylinder space between the plunger and the inlet check and formed with an annular, small-area valve seat; together with a spring pressed check valve formed with a steep-cone portion extending through said annular valve seat with its smaller end toward the cylinder outlet whereby its wedging effect on the grease is mainly radial.

6. A grease pump, including a cylinder, plunger, means for reciprocating the plunger and an outlet check valve having a portion of its surface formed as a cone of steep pitch with its small end presented toward flow of grease passing out through said outlet.

7. Means for forcing grease at high pressure, in combination with an outlet check valve for preventing reverse flow of grease when the direction of pressure is reversed, said valve being in the form of a conical frustrum with its smaller end presented against the force feed flow and its larger end presented against reverse pressure flow.

8. Means for forcing grease at high pressure, in combination with an outlet check valve for preventing reverse flow of grease when the direction of pressure is reversed, said valve being in the form of a conical frustrum with its smaller end presented against the force feed flow and its larger end presented against reverse pressure flow, the outflow conduit being formed with a very narrow seat against which said cone valve makes lateral wedging contact when it closes.

9. A grease pump having its cylinder and plunger vertically disposed and provided with a gravity seated ball check in the bottom of the cylinder, a lateral outlet above the ball check, an outlet check valve, a powerful spring for urging the latter toward the closed position and means accessible from the outside of the cylinder for initially adjusting the normal pressure of said spring against said valve.

10. A grease pump having its cylinder and plunger vertically disposed and provided with an inlet and a gravity seated ball check in the bottom of the cylinder, a lateral outlet above the ball check, an outlet check valve therein having a portion of its surface formed as a cone of steep pitch with its small end presented against the flow of grease passing out through said outlet.

11. A grease pump having its cylinder and plunger vertically disposed and provided with an inlet and a gravity seated ball check in the bottom of the cylinder, a lateral outlet above the ball check, an outlet check valve therein having a portion of its surface formed as a cone of steep pitch with its small end presented against the flow of grease passing out through said outlet, and formed with an extension projecting into the pump cylinder above the inlet ball as a retainer for the latter.

12. A grease pump having its cylinder and plunger vertically disposed and provided with an inlet and a gravity seated ball check in the bottom of the cylinder, a lateral outlet above the ball check, an outlet check valve therein having a portion of its surface formed as a cone of steep pitch with its small end presented against the flow of grease passing out through said outlet, together with a powerful spring for urging the said cone valve toward the closed position and means for adjusting the normal pressure of said spring against said valve.

13. A grease pump comprising an integral casting having formed therein in the same vertical plane, a vertical pump cylinder with an intake through the bottom thereof, aligned transverse passages leading from the pump cylinder substantially above the bottom thereof in opposite directions, both said passages being formed with valve seats, one normally closed by a hand-operated valve and the other by an automatic spring pressed check valve and the latter conduit having its outer portion screw-threaded for engagement by a conduit to be supplied with the lubricant, another conduit with valve seat tapping said outlet conduit and provided with a hand-operated normally closed relief valve, the upper portion of said casting being formed with bearings in which an upwardly extending link is pivoted, together with a lever pivotally secured to said link and to the upper end of a pump piston, which is thereby reciprocated in said pump cylinder.

14. A grease pump comprising an integral casting having formed therein in the same vertical plane, a vertical pump cylinder with an intake through the bottom thereof, aligned transverse passages leading from the pump cylinder substantially above the bottom thereof in opposite directions, both said passages being formed with valve seats, one normally closed by a hand-operated valve and the other by an automatic spring pressed check valve and the latter conduit having its outer portion screw-threaded for engagement by a conduit to be supplied with the lubricant, another conduit with valve seats tapping said outlet conduit and provided with a hand-operated normally closed relief valve, the upper portion of said casting being formed with bearings in which an upwardly extending link is pivoted, together with a lever pivotally secured to said link and to the upper end of a pump piston which is thereby reciprocated in said pump cylinder, said base being formed also with a transverse duct extending beneath and supplying the intake of the pump cylinder.

15. The combination specified by claim 14, with the further feature that the cast iron base has formed integrally therewith, a reservoir cavity into the bottom of which said supply cavity is tapped from the outside of the casting, its outer end being permanently closed by a screw plug.

16. A grease pump, including a small area plunger, power multiplying means for reciprocating it and a cylinder provided with an inlet with check valve, an outlet with check valve and an outlet conduit with an outer coupling for grease-tight connection with a lubricating duct, in combination with an automatic relief valve adapted to vent pressure from a point between the inlet check valve and said coupling, the movable parts of said valve including a screw plug, a spring within the plug, a plunger having a head within the plug against which the spring presses and a shank extending beyond the end of the plug and a valve head held in engagement with the valve seat by said shank of the spring pressed plunger.

17. A lubricating apparatus, including a reservoir for supplying grease under pressure, a force pump supplied thereby, a conduit through which the force pump discharges and a coupler adapted to detachably connect the latter to a duct to be lubricated; said reservoir including a cylinder closed at one end and having a piston for forcing lubricant toward the other end, and having a closure to which said other end is secured detachably, for removal and re-filling through said end; said force pump being carried by said closure and including a small area cylinder and plunger and power multiplying means for reciprocating such plunger; said pump cylinder having an intake for force feed of grease from the reservoir upon retraction of the plunger and an outlet from the discharge end of said pump cylinder through which the grease may be pumped at high pressure to said coupler, in combination with an air vent arranged to vent from the discharge end of said pump cylinder any air that is enclosed with the grease in refilling the reservoir, and a manually operated valve for opening and closing said vent, for the purpose described.

Signed at New York, in the county of New York and State of New York, this 10th day of December, A. D. 1925.

CHARLES L. ZABRISKIE.